United States Patent
Fukuo et al.

(10) Patent No.: US 6,203,910 B1
(45) Date of Patent: *Mar. 20, 2001

(54) CRAYON

(75) Inventors: Hidetoshi Fukuo, Yao; Shinji Tsujio, Sakai, both of (JP)

(73) Assignee: Sakura Color Products Corporation, Osaka-fu (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,605

(22) Filed: Dec. 29, 1997

(51) Int. Cl.[7] ....................................... B32B 27/38
(52) U.S. Cl. .......................... 428/413; 428/515; 428/519; 428/521; 428/500
(58) Field of Search ............................ 260/29.6; 428/500, 428/515, 519, 521, 413

(56) References Cited

U.S. PATENT DOCUMENTS 3,846,363 * 11/1974 Audo et al. .................. 260/29.6 BM

* cited by examiner

*Primary Examiner*—Merrick Dixon
(74) *Attorney, Agent, or Firm*—Sughrue, Mion, Zinn, Macpeak & Seas, PLLC

(57) ABSTRACT

A primary object of this invention is to provide a novel crayon which assures that the crayon has all of higher safety, superior writability and improved adhesion, and the invention provides a crayon containing a pigment component, a gelling agent, an organic solvent and a resin component, the organic solvent consisting of propylene glycol monomethyl ether and dipropylene glycol monomethyl ether.

6 Claims, No Drawings

CRAYON

FIELD OF THE INVENTION

The present invention relates to a novel crayon.

BACKGROUND OF THE INVENTION

Crayons are known which comprise a pigment component, an organic solvent, a resin component, a gelling agent and the like. Specific examples of such crayons are those prepared by gelling raw materials, i.e. at least one of dibenzylidene sorbitol, derivatives thereof, tribenzylidene sorbitol and derivatives thereof and a resin component (Japanese Examined Patent Publication No. 23619/1979). These crayons have the features that they remain unchanged in properties at elevated temperatures, and stick well to the surface of various materials to which a crayon is applied (such as metals, plastics and so on), and that the crayon layer on the material becomes so hardened as to inhibit the transfer of color to other materials.

Also known are crayons further improved in hardness, adhesion to the surface of a material, writability and other properties (Japanese Examined Patent Publication No. 41716/1980). These crayons comprise (a) at least one species selected from cellulose resins and vinyl resins, (b) at least one species selected from ketone resins, xylene resins, amide resins and terpene resins, (c) at least one species selected from dibenzylidene sorbitol, tribenzylidene sorbitol and derivatives thereof, (d) at least one species selected from glycols, ethers of glycols, esters of glycols and esters of benzoic acid, and (e) a pigment component.

However, even these crayons need to be further improved in writability (or ease of writing) for application to a wide variety of materials.

Moreover, in recent years, various countries have raised safety criteria for crayons. Thus it is now desired to develop crayons which assure meeting such high safety criteria. Especially there is room for further improvement of organic solvents to be used in crayons. For example, an alcohol (especially ethanol) may be used as the solvent only if the increase of safety is intended. However, the use of alcohol as the solvent fails to impart satisfactory writability and adhesion.

SUMMARY OF THE INVENTION

It is a primary object of the present invention to provide a crayon which can fulfill higher safety criteria and which is superior in both writability and adhesion.

The present inventors conducted extensive research to resolve the prior art problems and successfully prepared a novel crayon which can achieve the object. The present invention was completed in this way.

According to this invention, there is provided a crayon comprising a pigment component, a gelling agent, an organic solvent and a resin component, the organic solvent consisting of propylene glycol monomethyl ether and dipropylene glycol monomethyl ether.

DETAILED DESCRIPTION OF THE INVENTION

To produce a crayon according to the invention, both propylene glycol monomethyl ether (solvent A) and dipropylene glycol monomethyl ether (solvent B) are used as the organic solvent. The amount of the organic solvent (total amount of solvents A and B) in the crayon of the invention is suitably variable depending on the factors associated with the pigment component and other components, but is usually about 20 to about 80% by weight, preferably about 35 to about 60% by weight. If a more amount of the organic solvent is used, it is difficult to form a gel, whereas a less amount thereof makes it difficult to dissolve the other components, failing to form a homogeneous gel.

While the proportions of the solvents A and B to be used can be suitably determined depending on the factors associated with other components, usually a solvent A : solvent B weight ratio is 1:0.1–10, preferably 1:0.2–5.

Useful gelling agents are not limited and include those conventionally used for crayons (those prepared by a process involving gelation). It is preferred in the practice of the invention to use at least one of dibenzylidene sorbitols and tribenzylidene sorbitols. Namely at least one of dibenzylidene sorbitol, tribenzylidene sorbitol and derivatives thereof can be used in the practice of the invention.

Useful dibenzylidene sorbitol derivatives include, for example, dibenzylidene sorbitols having a benzylidene group substituted at an optional position of benzene nucleus with an alkyl group having 1 to 3 carbon atoms, such as [di-(p-methylbenzylidene)]-sorbitol, [di-(m-ethylbenzylidene)]-sorbitol, [di-(p-chlorobenzylidene)]-sorbitol, etc. Useful tribenzylidene sorbitol derivatives include, for example, tribenzylidene sorbitols having a benzylidene group at an optional position of benzene nucleus with an alkyl group having 1 to 3 carbon atoms, such as [tri-(p-methylbenzylidene)]-sorbitol, [tri-(m-ethylbenzylidene)]-sorbitol, [tri-(p-chlorobenzylidene)]-sorbitol, etc.

The amount of the gelling agent in the crayon of the invention can be suitably determined according to the type of gelling agent to be used and other factors, but is usually about 2 to about 12% by weight, preferably about 3 to about 10% by weight. If a more amount of the gelling agent is used, the gel hardness is too high, leading to decreased coloring ability, whereas a less amount thereof is responsible for difficulty of gelation.

Examples of the resin component include those conventionally used for the above-mentioned crayons prepared by gelation and are not limited. In the practice of the invention, it is favorable to use two types of resins, i.e. a film-forming resins and an adhesion-improving resin.

There is no limitation on the kind of film-forming resins to be used insofar as they can enhance the hardness of crayons and can form a tough film on the surface of a material to which a crayon is applied. Examples of useful film-forming resins are cellulose acetate butyrate, ethyl cellulose, acetyl cellulose and like cellulose resins, polyvinyl butyral, polyvinyl acetate, vinyl acetate-vinyl chloride copolymer resins, vinyl acetate-ethylene copolymer resins and like vinyl resins. These resins can be used either alone or in combination. Among them, it is preferred to use polyvinyl butyral containing up to 5% of acetyl group, 18 to 27% of hydroxyl group and at least 69% of butyral group and having a polymerization degree of 300 to 2,000.

There is no limitation on the kind of adhesion-improving resins to be used insofar as they can improve the adhesion to the surface of a material. Examples of such resins are ketone resins, xylene resins, amide resins, etc. Useful ketone resins include, for example, a condensate of cyclohexanone and formaldehyde. Useful xylene resins include, for example, a condensate of metaxylene and formalin. Useful amide resins include. for example, thermoplastic resins prepared by condensation polymerization of dimer acid and diamine or polyamine and having a molecular weight of about 4000 to about 9000. These adhesion-improving resins can be used either alone or in combination.

The amount of the resin component in the crayon of the invention may be varied depending on the type of resin component to be used, but is usually about 3 to about 45% by weight, preferably about 6 to about 40% by weight. A more amount of the resin component used excessively increases the gel hardness, resulting in lowered coloring ability, whereas a less amount thereof causes difficulty in gelation.

The proportions of the film-forming resin and the adhesion-improving resin to be used can be suitably determined depending on the factors associated with other components. Yet, usually a film-forming resin : adhesion-improving resin weight ratio is 1:0.1–5, preferably 1:0.2–3.

There is no restriction on the kind of pigment component to be used. The pigment component to be used can be any of conventional pigments and dyes. Pigments which can be used are, for example, titanium oxide, red iron oxide, Ultramarine Blue, Cobalt Blue, iron yellow, iron black, Titanium Yellow and like inorganic pigments, and condensed azo, Phthalocyanine Blue, Phthalocyanine Green, Indanthrone Blue, quinacridone, diketo-pyrrolo-pyrrole, dioxazine and like organic pigments. Conventional extender pigments such as calcium carbonate, clay and zinc oxide are usable as the pigment component. Further useful are phosphorescent pigments, fluorescent pigments, synthetic mica, metal powders and the like. Carbon black is also usable.

Solvent dyes can be suitably used as the dye in the invention. Examples of useful solvent dyes are phthalocyanine dye, pyrazolone dye, nigrosine dye, anthraquinone dye, azo dye, chrome-containing metallic dye and like conventional dyes including commercially available dyes.

The amount of the pigment component in the crayon of the invention may be properly determined according to the type of pigment to be used and other factors. It is usually about 0.1 to about 30% by weight, preferably about 0.5 to about 25% by weight. A more amount of the pigment component used reduces the correlative amounts of other components too much to produce respective effects, whereas a less amount thereof used fails to produce a satisfactory color.

Other components can be used in the crayon of the invention and include conventional additives such as coloring agents, fillers, leveling agents, viscosity modifiers, thixotropic agents and desiccants. Other components also include plasticizers such as diethyl phthalate, dibutyl phthalate, dioctyl phthalate, epoxyhexahydrophthalic acid-2-ethylhexyl, sebasic acid-2-ethylhexyl, tricresylphosphate and the like.

The gel hardness of the crayon according to the invention is suitably determined depending on the purpose of end product or other factors. It is usually about 5 to about 50 kg/cm$^2$, preferably about 7 to about 30 kg/cm$^2$. The gel hardness may be varied according to the type and amount of the organic solvent, gelling agent and other components.

The crayon of the invention can be prepared basically by uniformly mixing together the above-mentioned components. For example, a film-forming resin is dissolved in propylene glycol monomethyl ether. A pigment component is added to the obtained solution and the mixture is thoroughly dispersed by a mill or the like. Thereafter dipropylene glycol monomethyl ether and an adhesion-improving resin are added to obtain a solution. The solution is poured into a container having the desired shape of end product, cooled and solidified. In the above process, optionally the components may be heated when dissolved in the solvent. The crayon of the invention can also be prepared by conventional methods of producing crayons using these components.

According to the present invention, a crayon is prepared using the specific two organic solvents, i.e. propylene glycol monomethyl ether and dipropylene glycol monomethyl ether, which enables fulfillment of criteria both for high safety and for writability.

The crayon of the invention allows smooth application, in writing or coating, to any of materials such as metals, ceramics, plastics and glasses as well as papers, and sticks well to them. The crayon of the invention becomes so hardened after application to a material as to inhibit the transfer of color to other materials. The crayon of the invention is superior in leveling ability to conventional crayons, and permits rapid writing. Moreover, the crayon of the invention is excellent in cap-off properties and easier to handle than conventional crayons.

The crayon of the invention is outstanding in both safety and writability (ease of writing), is applicable to any material and can be suitably used for wide applications as a drawing material, marker, coating material or the like.

EXAMPLES

Example 1

Nineteen parts by weight of a polyvinyl butyral resin (trade name "Denkabutyral 2000L", product of Denki Kagaku Kogyo Co., Ltd.) was dissolved in 21 parts by weight of propylene glycol monomethyl ether. Eighteen parts by weight of a pigment (Pigment White 6) was added to the obtained solution. Then the mixture was thoroughly dispersed by a mill. Added to the dispersion were 19 parts by weight of dipropylene glycol monomethyl ether and 4 parts by weight of dibutyl phthalate. While the mixture was heated to 130° C. with stirring, there were added 5 parts by weight of a ketone resin (trade name "Highlac 111", product of Hitachi Kasei Co., Ltd.) and 6 parts by weight of an amide resin (trade name "Barsamide 335", product of Henkeruhakusui Co., Ltd.). Subsequently the mixture was maintained at the same temperature for complete dissolution. Thereafter 6 parts by weight of dibenzylidene sorbitol was added, followed by complete dissolution. The obtained solution was poured into a container wherein it was cooled and solidified. Thereafter the solid product thus obtained was taken out from the container.

Example 2

Added to 23 parts by weight of propylene glycol monomethyl ether was 14 parts by weight of cellulose acetate butyrate (trade name "CAB 381-½"", product of Eastman Chemical Co., Ltd.). The obtained solution was mixed with 14 parts by weight of a pigment (Pigment White 6) and 3 parts by weight of a pigment (Pigment Yellow 55), and the mixture was thoroughly dispersed by a mill. Added to the dispersion were 20 parts by weight of dipropylene glycol monomethyl ether and 4 parts by weight of dibutyl phthalate. Seventeen parts by weight of a xylene resin (trade name "Nikanol HP-120", product of Mitsubishi Gas Kagaku Co., Ltd.) was added while the mixture was heated at 130° C. with stirring. The mixture was maintained at the same temperature to completely dissolve the components. Five parts by weight of tribenzylidene sorbitol was added, followed by complete dissolution. The obtained solution was poured into a container wherein it was cooled and solidified. The solidified. The solid product thus obtained was taken out from the container.

Example 3

Seventeen parts by weight of a polyvinyl butyral resin (trade name "Eslec BL-1", product of Sekisui Chemical Co., Ltd.) was dissolved in 24 parts by weight of propylene glycol monomethyl ether. The solution was mixed with 13 parts by weight of a pigment (Pigment White 6) and 5 parts by weight of a pigment (Pigment Green 7). Then the mixture was thoroughly dispersed by a mill. Added to the dispersion were 23 parts by weight of dipropylene glycol monomethyl ether, 3 parts by weight of dibutyl phthalate and 10 parts by weight of a ketone resin (trade name "Highlac 111", product of Hitachi Kasei Co., Ltd.). The mixture was heated to 130° C. with stirring and maintained at the same temperature until complete dissolution. Five parts by weight of dibenzylidene sorbitol was added, followed by complete dissolution. The obtained solution was poured into a container wherein it was cooled and solidified. Then, the solid product thus obtained was taken out from the container.

Example 4

Twelve parts by weight of a polyvinyl butyral resin (trade name "Denkabutyral 2000L", product of Denki Kagakukogyo Co., Ltd.) was dissolved in 16 parts by weight of propylene glycol monomethyl ether. Seven parts by weight of a pigment (Pigment Black 7) was added to the solution, followed by thorough dispersion by a mill. Added to the dispersion were 38 parts by weight of dipropylene glycol monomethyl ether and 4 parts by weight of dibutyl phthalate. While the mixture was heated at 130° C. with stirring, there were added 8 parts by weight of a ketone resin (trade name "Highlac 111", product of Hitachi Kasei Co., Ltd.) and 9 parts by weight of an amide resin (tradename "Barsamide 335", product of Henkeruhakusui Co., Ltd.). The mixture was maintained at 130° C. until complete dissolution. Then, 6 parts by weight of dibenzylidene sorbitol was added for complete dissolution. The obtained solution was poured into a container wherein it was cooled and solidified. Then, the solid product thus obtained was taken out from the container.

Comparative Example 1

The same procedure as in Example 4 was carried out with the exception of using ethylene glycol monobutyl ether in place of the propylene glycol monomethyl ether and dipropylene glycol monomethyl ether used in Example 4 as the organic solvent, thereby producing a solid product.

Comparative Example 2

The same procedure as in Example 4 was carried out with the exception of using ethylene glycol monomethyl ether in place of the propylene glycol monomethyl ether and dipropylene glycol monomethyl ether used in Example 4 as the organic solvent, thereby producing a solid product.

Comparative Example 3

The same procedure as in Example 4 was carried out with the exception of using ethanol in place of the propylene glycol monomethyl ether and dipropylene glycol monomethyl ether used in Example 4 as the organic solvent, thereby producing a solid product.

Comparative Example 4

The same procedure as in Example 1 was carried out with the exception of not using dipropylene glycol monomethyl ether as the organic solvent, thereby producing a solid product.

Comparative Example 5

The same procedure as in Example 1 was carried out with the exception of not using propylene glycol monomethyl ether as the organic solvent, thereby producing a solid product.

Test Example 1

The solid products (crayons) obtained in the Examples and Comparative Examples were tested for the writability and other properties. The results are shown in Table 1. The properties of the solid products were evaluated as follows.

(1) Writability

An organoleptic test was performed by writing directly on an iron plate and on a plastics plate using each crayon. The crayon showing little or no resistance (no scratching) was rated as A. The crayon showing a little resistance (scratching) was rated as B. The crayon which did not allow writing was rated as C.

(2) Cap-off Properties

The writability was evaluated after each crayon was left bare for 6 hours. The writing test was conducted in the same manner as in item (1).

(3) Gel Hardness

The gel hardness was measured using a semiconductor pressure transducer ("PMS-5 Model 10H", product of Toyota Kogyo Co., Ltd.).

(4) Toxicity

The crayon was tested for toxicity according to Art and Creative Materials Institute and Council Directive 67-548-EEC. The results were rated as A when it satisfied the criteria under the solvent regulation and as B when it required the indication of toxicity level.

TABLE 1

|  | Writability | Cap-off properties | Gel hardness (kg/cm$^2$) | Toxicity |
| --- | --- | --- | --- | --- |
| Example 1 | A | A | 14.6 | A |
| Example 2 | A | A | 21.5 | A |
| Example 3 | A | A | 12.6 | A |
| Example 4 | A | A | 13.8 | A |
| Comparative Example 1 | B | B | 7.6 | C |
| Comparative Example 2 | B | C | 8.4 | C |
| Comparative Example 3 | B | C | 5.4 | A |
| Comparative Example 4 | A | C | 9.8 | A |
| Comparative Example 5 | B | A | 28.5 | A |

As apparent from the results of Table 1, the crayons of the present invention prepared combinedly using propylene glycol monomethyl ether and dipropylene glycol monomethyl ether are excellent in both safety and writability.

What is claimed is:

1. An anhydrous crayon comprising a pigment component, a gelling agent, an organic solvent and a resin component, the organic solvent consisting of propylene glycol monomethyl ether and dipropylene glycol monomethyl ether.

2. The crayon according to claim 1, wherein the gelling agent is at least one of dibenzylidene sorbitols and tribenzylidene sorbitols.

3. The crayon according to claim 1, wherein the resin component includes at least one of cellulose resins and vinyl resins, and at least one of ketone resins, xylene resins and amide resins.

4. The crayon according to any one of claims 1 to 3, wherein the amount of the organic solvent in the crayon is 20 to 80% by weight.

5. The crayon according to any one of claims 1 to 3, wherein the weight ratio of propylene glycol monomethyl ether to dipropylene glycol monomethyl ether is 1:0.1–10.

6. The crayon according to any one of claims 1 to 3, wherein the gel hardness of the crayon is 5 to 50 kg/cm$^2$.

* * * * *